United States Patent [19]

Bommer

[11] 4,324,755

[45] Apr. 13, 1982

[54] PROCESS FOR PUTTING A LIP ON A THICK-WALLED TUBE OF FLEXIBLE MATERIAL, AND APPARATUS FOR PRACTICING SAME

[75] Inventor: Raymond Bommer, La Forteresse, France

[73] Assignee: Cabinet Patco, Paris, France

[21] Appl. No.: 184,364

[22] Filed: Sep. 5, 1980

Related U.S. Application Data

[63] Continuation-in-part of Ser. No. 96,510, Nov. 21, 1979, abandoned, which is a continuation of Ser. No. 849,422, Nov. 7, 1977, abandoned.

[30] Foreign Application Priority Data

Nov. 5, 1976 [FR] France ............................ 76 33363

[51] Int. Cl.³ .............................................. B28B 1/46
[52] U.S. Cl. ..................................... 264/312; 264/296; 264/320; 425/392; 425/393; 425/DIG. 218
[58] Field of Search ................... 264/296, 312, 320; 425/392, 393, DIG. 218

[56] References Cited

U.S. PATENT DOCUMENTS 3,089,187  5/1963  Wolfe ..................... 264/210 R X
3,991,150  11/1976  De Putter ........................ 264/68

Primary Examiner—Thomas P. Pavelko
Attorney, Agent, or Firm—Staas & Halsey

[57] ABSTRACT

A process and apparatus for putting a lip on a thick-walled tube of flexible material such as polyethylene comprises a cold rolling of the thick-walled tube with as little friction as possible on the wall of the tube. This is effected by vertically mounted rollers where the axis thereof is in substantial alignment with the axis of the tube being flared. At least one of the mandrels is rotated, and at least one of the mandrels is mounted for vertical movement and for putting pressure upon the wall of the tube during the rolling.

10 Claims, 2 Drawing Figures

PROCESS FOR PUTTING A LIP ON A THICK-WALLED TUBE OF FLEXIBLE MATERIAL, AND APPARATUS FOR PRACTICING SAME

CROSS REFERENCE TO RELATED APPLICATIONS

This application is a Continuation-in-Part of application Ser. No. 096,510 filed Nov. 21, 1979, which is a Continuation of application Ser. No. 849,422 filed Nov. 7, 1977, both now abandoned.

BACKGROUND OF THE INVENTION

1. Field of the Invention

The present invention is concerned with a new procedure for the flaring or belling of thick-walled tubes of flexible plastic material, and with a device for carrying out the procedure.

More specifically, the invention is applied to tubes of flexible plastic material, such as those made of polyethylene, having a relatively great thickness (difference between the internal and external diameters of the tubes) of about 4 mm or more.

2. Description of the Prior Art

Traditionally, the flaring of such tubes of relatively great thickness is accomplished by using mandrels, with heat, in such a way as to soften the wall of the tube enough to obtain the selected flaring.

Actually, such flaring is not durable for tubes of a high degree of thickness since the heat applied to the wall of the tube does not reach the central area of the wall unless the heat is applied for a long time, at a high heating temperature, which inevitably leads to a superficial fusion of the wall. Such a fusion is not recommended, since then there is deterioration of the tube.

The major disadvantage of the traditional procedure is the fact that the central area of the tube's wall is not heated which leads to a contraction of the flaring after the tube is cooled. Stated another way, the flaring tends to disappear, and the tube has a tendency to resume its initial diameter.

SUMMARY OF THE INVENTION

The present invention mitigates the above disadvantage since the new procedure that is used prevents any further contraction of the flaring, and an increased durability of the flaring results from this.

More specifically, the procedure for flaring thick-walled tubes of flexible plastic material, such as polyethylene, with which the present invention is concerned consists of a cold rolling of the wall of the tube of plastic material to be subjected to flaring with a reduction of friction to the maximum extent possible.

The present invention is also concerned with the device for carrying out the above procedure.

In a preferred embodiment of the invention, the device includes at least two mandrels that are applied to both sides of the wall of the tube to be flared, with one of the mandrels exerting radial pressure with respect to that wall.

The essential element of the invention, then, comprises the procedure for flaring tubes of flexible plastic material which is a cold rolling with as little friction as possible of the wall of the tube, and particularly when the wall is made of polyethylene. In fact, that material is only adapted with difficulty to the traditional flaring, with heat, and it undergoes sizable contraction in connection with that kind of heat flaring.

On the other hand, cold rolling with very little friction of such a material results in an end product which is particularly stable. This type of frictionless, cold rolling produces an elongation, and then an increase in the diameter of the place that is rolled. The elongation is accompanied by a change in the orientation of the molecular chains of the plastic material and, in contrast to what takes place in the conventional procedure, that change is irreversible. Hence, the stability of the flaring.

Furthermore, when the rolling has been accomplished cold, there is no danger that the tube's wall will be altered chemically during the flaring, whereas certain chemical reactions can take place in the tube when it is done with heat, which result in a modification of the mechanical properties of the tube in connection with the flaring.

Another element of the invention is concerned with the device for carrying out the above-mentioned procedure.

Preferably, the device will be the one illustrated in the accompanying drawing, which shows the device at the time the flaring is practically completed.

Other advantages and characteristics will become more apparent in reading the description which follows. The description refers to the drawing and describes the embodiments represented in the drawing, but is not to be considered limiting as far as the invention is concerned. The drawing represents, schematically, the device for carrying out the procedure.

DESCRIPTION OF THE PREFERRED EMBODIMENT(S)

The technology of the present invention involves a procedure and apparatus for making a bell (Flaring or belling) on one end of a thick walled tube to enable joining of two such tubes.

Such bells are generally processed with mandrels and with heat. When the tube is made of polyethylene, such processes do not give satisfactory results because with age, and when the belled tube is subject to changing temperature (for instance if it is stocked outside), the bell does not keep its original diameter, but is deformed.

The essential characteristic of the processes of the present invention consists in making the bell at room temperature (i.e., cold), or preferably at a temperature which is for the polyethylene lower than the temperature at which the molecular structure is modified, that is 80° C.

Accordingly, the machine preferably has one external mandrel 14 and an internal mandrel 13 which is rotationally driver.

Figure 1:
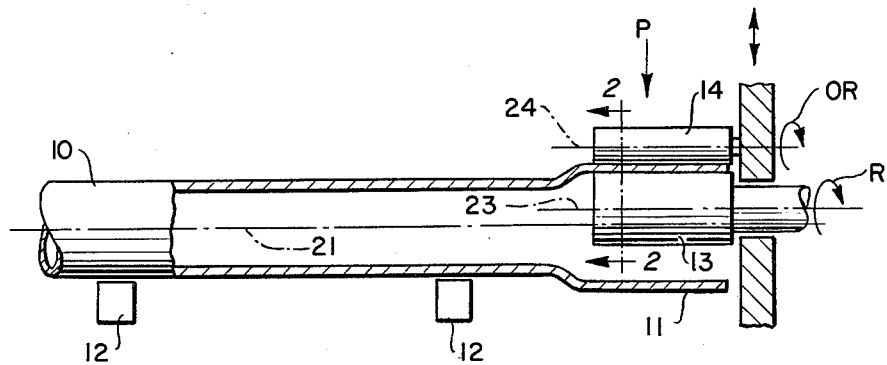
FIG. 1 is a view, partly in section, illustrating the subject process and device.
Figure 2:
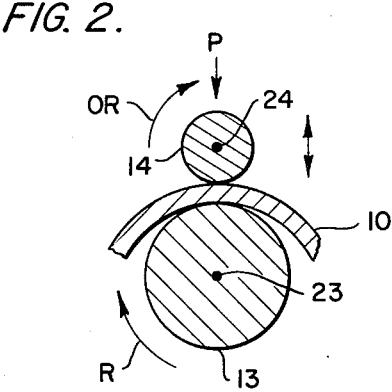
FIG. 2 is an end view taken along lines 2—2 of FIG. 1.

In FIG. 1, the tube 10 is resting on rollers 12, or the like, and is put into rotation by the mandrel 13, which is located inside the tube 10 and has the inner wall of the tube resting thereupon. Arrow R indicates the power rotation of mandrel 13. Another mandrel 14, situated opposite the mandrel 13, completes the device. The use of conventional structure makes it possible to exert a progressive pressure P on the mandrel 14 such that it produces a rolling of the wall of the tube located between the mandrels 13 and 14. Preferably, the longitudinal axis 23 of the mandrel 13 is fixed, and, when the pressure P is exerted, the longitudinal axis of the mandrel 14 is displaced vertically with respect to the mandrel 13, thus assuring the desired rolling with a minimum of friction. For best results, the axis 24 of mandrel 14 is directly over the axis 23 of mandrel 13. Also, the axis 21 of the tube 10 should be in the same plane as the aligned axes 23 and 24.

Several variations are possible in connection with this device. Thus, in addition to having the mandrel 13 activated by a rotating movement, the external mandrel 14 can also be put in rotation as indicated by the reference characters OR (optional rotation).

Furthermore, the same rolling can be obtained by using a number of mandrels which are located inside and/or outside of the said tube, with at least one of the said mandrels exerting the above-mentioned pressure P. However, it has been discovered that for the minimum of friction, and thus the least amount of frictional rolling heat, two mandrels with their respective axis directly aligned vertically produce the best results.

In order to obtain good results, that is a bell maintaining a constant diameter with age and thus being permanent, the following parameters have been used successfully:

external diameter of the tube 10=100 millimeters
external diameter of the finished bell 11=112 millimeters
thickness of the tube 10=6 millimeters
thickness of the finalized bell 11=5.25 millimeters
diameter of the internal mandrel 13=65 millimeters
speed of the mandrel 13=300 revolutions a minute
speed of the tube 10=195 revolutions a minute
time necessary for the belling=40 seconds
length of the mandrel 13=15 centimeters
force of the external mandrel 14=2500 kilos.

During the belling procedure, the tube 10 has preferably the same temperature, a low one which is about normal room temperature of 25° C.

However, when the speed of the internal mandrel 13 increases, the temperature of the tube can increase. To avoid this, a cooling device can be added in the internal mandrel 13. So, the temperature of the tube during belling is always maintained near room temperature (25° C.) and the finalized bell 11 is permanent, and will not deform with age, or with outside storage conditions, etc.

This, of course, is because with the substantially frictionless cold rolling of subject invention, a permanent orientation of the molecules of the plastic material is achieved which prevents or avoids any shrinkage after the flaring.

The foregoing is considered as illustrative only of the principles of the invention. Further, since numerous modifications and changes will readily occur to those skilled in the art, it is not desired to limit the invention to the exact construction and operation shown and described and accordingly all suitable modifications and equivalents may be resorted to, falling within the scope of the invention.

I claim:

1. A procedure for flaring thick-walled tubes of flexible plastic material, of the type in which the said flaring is accomplished cold, wherein, in order to obtain a preferred and permanent orientation of the molecules of the plastic material, avoiding any shrinkage after flaring, the said flaring is obtained by means of the step of rolling at room temperature with the step being effected by an outer roller and an inner roller, and with both rollers and the tube rotating simultaneously, and further by the step of reducing friction to the maximum extent possible.

2. A procedure for flaring thick-walled tubes of flexible plastic material, of the type in which the said flaring is accomplished cold, wherein, in order to obtain a preferred and permanent orientation of the molecules of the plastic material for the purpose of avoiding any shrinkage after flaring, the said flaring is obtained by means of the step of rolling at room temperature, with the step being effected by an outer roller and an inner roller, and with both rollers and the tube rotating simultaneously, and further by the step of reducing friction to the maximum extent possible during said first step of rolling, and said flaring being obtained by means of radial pressure with respect to the longitudinal axis of the wall.

3. A procedure according to claim 2 wherein the radial pressure is directed from outside the tube toward its inside.

4. A device for flaring thick-walled tubes of flexible plastic material wherein the structure making the said flaring possible comprises only two mandrels applied to both sides of the wall constituting the said tube, by one mandrel inside of said tube having its axis offset from the axis of the pipe to be flared and the other mandrel outside of said tube and with said mandrels exerting a radial pressure with respect to the said wall, and with both of said mandrels being maintained at room temperature.

5. A device according to claim 4 wherein, the mandrel located inside the tube is activated by a rotating movement and puts the tube into rotation.

6. A device according to claim 5, wherein the mandrel located outside the tube is activated also by a rotating movement.

7. A device according to claim 5, wherein the axis of the inside mandrel is fixed, and the outside mandrel is displaced vertically.

8. A device according to claim 5, wherein the axis of the inside mandrel and the axis of the outside mandrel are in substantial vertical alignment, and the axis of the thick-walled tube being flared is substantially in alignment with the plane of said inside and outside mandrel axes.

9. A device according to claim 8, wherein the axis of the inside mandrel is fixed, and the outside mandrel is displaced vertically.

10. A device according to claim 9, wherein the mandrel located outside the tube is activated also by a rotating movement.

* * * * *